Patented Dec. 31, 1946

2,413,332

UNITED STATES PATENT OFFICE 2,413,332

COMPOSITION OF MATTER SUITABLE FOR USE AS A LUBRICANT AND LUBRICANT COMPRISING THE SAME

John M. Musselman, South Euclid, Ohio, assignor to The Standard Oil Company, Cleveland, Ohio, a corporation of Ohio No Drawing. Application December 15, 1943, Serial No. 514,421

21 Claims. (Cl. 252—32.7)

This invention relates to lubricants and more particularly to lubricants suited for various uses, including high pressures or high temperatures or both, as for internal combustion engines operating at high temperatures or for lubricating heavy equipment. Such lubricants are subject to breakdowns due to sludge and acid formation.

This application is a continuation-in-part of applications Serial No. 386,127, filed March 31, 1941, now issued as Patent No. 2,383,495 of August 28, 1945, Serial No. 455,344, filed August 19, 1942, and Serial No. 414,977, filed October 14, 1941.

An object of the invention is to provide a new composition suitable for use as a lubricant or as an addition agent in lubricating oils and greases to prevent sludge and acid formation under operating conditions.

Another object is to provide an inhibitor of the above type having novel and improved characteristics, and comprising a mixture of the reaction product of an ester wax with a phosphorus sulfide and a plural metal compound thereof.

Various other objects and advantages will be apparent as the nature of the invention is more fully disclosed.

Although the novel features which are believed to be characteristic of this invention are pointed out more particularly in the claims appended hereto, the invention will be better understood by referring to the following description in which certain specific embodiments thereof have been set forth for purposes of illustration.

In accordance with the present invention I have found that certain oxygen-containing ester waxes may be treated with a sulfide of phosphorus to form a reaction product, and that the mixture of the reaction product and a plural metal compound thereof may be produced, one of the metals by partial saponification of the reaction product with a plurality of metals to leave some of the reaction product as such with the saponified product thereof.

If the proportions of the wax and sulfide are such and the temperature conditions high enough, a reaction product containing sulfur and having a minimum of oxygen and phosphorus is produced. This is the preferred embodiment of the intermediate product to be partially saponified to the plural metal compound thereof. If these conditions do not obtain, the reaction product is or may contain a thiophosphate.

The reaction product is separated from a sludge containing oxygen and phosphorus, probably in the form of oxides of phosphorus, along with other materials. In the preferred embodiment, the reaction indicated by the observed facts appears to be one in which sulfur replaces the major portion of the oxygen in the wax, and the displaced oxygen combines with the phosphorus to form a phosphorus oxide which can be removed with the sludge. When a thiophosphate is formed, the phosphorus content of the sulfide or at least a part of it is combined in wax.

The reaction product may then be reacted with a plurality of metal compounds to form the corresponding plural metal compound of the reaction product which remains in admixture with the unsaponified reaction product. Such mixtures have been found to possess characteristics suitable for use per se as a lubricant or for use as an inhibitor in various lubricating oils and greases.

In the preferred embodiment it is important that the reaction between the wax and the phosphorus sulfide be carried out at a temperature above the temperature of thiophosphate formation so that a minimum of phosphorus enters into the reaction product. The reaction product, therefore, is substantially free from or has a minimum of phosphorus or thiophosphates. Also, a minimum of oxygen remains in wax, since the phosphorus eliminates the removable oxygen from the wax, probably as a phosphorus oxide.

In the preferred embodiment it is also important that the amount of the phosphorus sulfide be at least equivalent to the theoretical quantity required for the sulfur to replace the oxygen of the wax. Since the atomic weight of sulfur is just double that of oxygen, it is desirable to use an amount of a phosphorus sulfide, such that the weight of the sulfur therein is double the weight of the oxygen contained in the wax. An excess of the theoretical amount may be of assistance in forcing the reaction to completion. The excess should not be too great, since at least part of any excess remains dissolved in the reaction product and increases the phosphorus content, as well as sulfur content, in the molal ratio present in phosphorus pentasulfide.

When practicing the invention on a commercial scale, it is practical to form the reaction product with less than 2% of oxygen and 1.5% of phosphorus.

The process is applicable to various oxygen-containing ester waxes which contain fatty acid esters of mono- and di-hydric alcohols, primarily the former. Examples are degras, lanolin, beeswax, sperm oil, carnauba wax, Japan wax, Chinese wax, spermaceti, whale oil, and the like, as well as the hydrogenated waxes, and in particular, hydrogenated sperm oil and hydrogenated degras and lanolin. The phosphorus sulfide, preferably, may be in the form of phosphorus pentasulfide or phosphorus sesquisulfide.

After the reaction is completed, any phosphorus oxide or oxides which separate out as a sludge, together with any other insoluble materials, may be removed from the reaction product by settling, centrifuging or filtering.

The reaction product prepared as above described may then be reacted with the metal compounds. The compounds of the metals, preferably, are the oxides and hydroxides, since they do not form by-products other than water, and the latter is easy to remove.

The metals may be selected in accordance with the characteristics required and the uses to which the material is to be applied. For example, the alkaline earth metal compounds impart excellent peptizing action or detergency without very much emulsification. The alkali metal compounds also impart peptizing action or detergency with a more pronounced emulsifying property. Compounds of other metals below magnesium in the electromotive series impart desirable metal inhibition properties. The presence of the unsaponified sulfide-wax reaction product due to partial saponification imparts characteristics attributable to the presence of the polar groups therein. In general the partially saponified mixture has the property of stabilizing mineral oil lubricants against breakdown, tends to maintain the solids in suspension and maintain particularly clean surfaces on the metal which it lubricates. It also raises the viscosity index of the oil and lowers the cold test.

If minimum emulsification is desired an alkaline earth metal compound, such as calcium, strontium, magnesium or barium may be selected as one of the metals. If more emulsification is required an alkali such as sodium, potassium, lithium or rubidium may be selected as one of the metals. A combination of these metals may be selected for an intermediate effect. In a preferred embodiment an alkali or alkaline earth metal with another metal below magnesium in the electromotive series, such as chromium, aluminum, arsenic, antimony, bismuth, cadmium, cobalt, mercury, etc., will be preferred for the best combined characteristics. If all effects are wanted an alkali metal, alkaline earth metal, and a metal below magnesium in the electromotive series may be used with the unsaponified product in admixture.

In general, when the lubricant is to be used under high temperature conditions, such as in an internal combustion engine, it is preferred that the metal selected as one of the metals not be iron, copper or other metal which may exert a pro-oxidant effect. However, iron and copper-containing compounds are quite useful themselves or as additives in a gear box and similar type lubricants and greases.

As a specific example of one of the preferred embodiments, degras may be reacted with about 18 to 25%, preferably about 23%, by weight of phosphorus pentasulfide at a temperature between 275° F. and 500° F., preferably 300° F. Degras has an oxygen content (by analysis) of 6 to 7%. An exothermic reaction occurs and generally a reaction time of an hour or slightly more or less is involved. The temperature is above the temperature of thiophosphate formation and may be carried out without introducing a substantial amount of phosphorus into the reaction product.

If a lower temperature is used a thiophosphate may be formed. The phosphorus and oxygen-containing sludge may be removed.

The reaction product of the preferred embodiment, depending on the proportions of ingredients and the temperature will contain 10 to 13% sulfur, 0.75 to 1.50% phosphorus, and 0.9 to 2.0% oxygen.

The reaction product is then treated preferably with oxides or hydroxides of the selected metals when the oxides and hydroxides are directly reactive with the reaction product. This reaction may take place at around 180° to 250° F. for a period of about 1 to 2 hours.

The amount of the metal compounds used to treat the reaction product will depend upon the characteristics desired in the final compound. In general 1.0% to 10% of the oxide or hydroxide of the alkali or alkalile earth metal and 1.0% to 10% of oxide or hydroxide of the other metal is preferred, based on the wax-sulfide reaction product, when a dual metal partial saponification product of this type is to be made. The amount of the metal compounds also will depend upon the degree of partial saponification. The wax-sulfide reaction product has a pH value of about 2 to 5, depending on the wax used and the exact conditions. When alkali and alkaline earth metals are used the completely saponified product has a pH of 8 to 10, depending on the reaction product and the metal used. In general, the amount of the metal compounds should be such that the pH of the material, after the partial saponification reaction is complete, is between that of the reaction product and the completely saponified product.

In those instances where the oxides or hydroxides of the metals react directly with the wax-sulfide reaction product to saponify it (which is the case with alkali metals, alkaline earth metals, aluminum, arsenic and some other metals), the preferred procedure is to use the oxides or hydroxides of the two metals. They may be added to the reaction product and reacted with it together or separately.

If the oxides or hydroxides of any of metals to be included is not sufficiently reactive, the initial wax-sulfide reaction product may be partly neutralized with caustic soda or potash and the resulting salt may be then reacted with a metal salt, such as the chloride or sulfate, to replace all or a part of the sodium and to form the desired metal compound through a double decomposition reaction. The alkali or alkaline earth metal may be introduced simultaneously with the other metal or after the double decomposition reaction.

I am not certain if both of the metals become chemically combined in a single molecule or if the new composition or additive comprises a mixture in which the two metals are each in different molecules. However, I intend either possibility to be covered and included within my description of the plural metal compound of the reaction product.

The above composition has been found suitable for use as a lubricant per se and is particularly effective as an inhibitor when used even in small percentages in lubricating oils and greases.

The amount of the above described mixture to be added to the oil or grease will depend on the characteristics of the oil or grease and its intended use. Some oils have more of a tendency to form acid and sludge than others and such oils require large quantities of the addition agent.

Also, oils that are intended for high temperature use, especially in the presence of pro-oxidant catalyst require larger amounts. In general the range is from 1 to 10%, but under some circumstances amounts as small as 0.01% show a remarkable improvement. Since the addition agent is a lubricant itself there is no upper limit to the amount that may be added to an oil or grease.

An S. A. E. 20 lubricating oil containing 5% of the partially saponified dual-metal salt of calcium and arsenic, when subjected to a standard twenty hour test in an Ethyl Gasoline Corporation type test engine, shows a remarkable improvement with reference to sludge formation, acid number, viscosity increase, and deposit on the piston skirt, as compared with the same oil without the addition agent when treated under similar conditions.

The particularly excellent peptizing action or detergency of the compound may be shown by the test method measuring the ability of the lubricants containing the additive to maintain carbon black in suspension. A similar carbon black suspension in an oil not containing the present compounds settles out relatively quickly. The compounds of the present invention are particularly valuable for addition to mineral oils suitable for Diesel type engine operation where products of composition produce material tending to block up small openings.

As a further illustration of the invention, degras was reacted with 23% of phosphorus pentasulfide at 300° F. for 2 hours, and the sludge formed was then separated. The reaction product was then partially saponified with a mixture of lime and potash in amounts such that equal molar quantities of each were used, and in a total amount such that the pH value was below 7, indicating incomplete saponification. After the partial saponifying reaction, the material was added to a Mid-Continent S. A. E. 30 motor oil in an amount of 3%. This was then subjected to a standard 20 hour test in an Ethyl Gasoline Corporation type test engine. At the conclusion of the run, the sludge, acid number, viscosity increase and skirt rating were decidedly superior to that resulting from the same S. A. E. 30 oil, without the addition agent, run under identical conditions.

If it is desired, additional sulfur may be incorporated into the reaction product for increasing the total sulfur content. Experience has shown that such sulfur can be added either to the wax-sulfide reaction product or to the metal compounds thereof. It is believed that such a reaction is one of adding sulfur to the sulfur already present, perhaps to form disulfides or polysulfides.

While a particular embodiment of the invention has been described, it will be understood that the invention is capable of various adaptations which will be readily apparent to a person skilled in the art. The invention is to be restricted in accordance with the scope of the following claims.

I claim:

1. A composition of matter suitable for use as a lubricant and as an addition agent in an amount to improve the characteristics of lubricating oils and greases, comprising the reaction product of a phosphorus sulfide and an oxygen-containing wax, in admixture with a plural metal compound of said reaction product.

2. A composition of matter suitable for use as a lubricant and as an addition agent in an amount to improve the characteristics of lubricating oils and greases, comprising the reaction product of phosphorus pentasulfide and degras, in admixture with a dual metal compound of said reaction product.

3. A composition of matter suitable for use as a lubricant and as an addition agent in an amount to improve the characteristics of lubricating oils and greases, comprising the reaction product of a phosphorus sulfide and an oxygen-containing wax reacted in proportions and at a temperature to replace a major portion of the oxygen in the wax with sulfur, in admixture with a plural metal compound of said reaction product.

4. A composition of matter suitable for use as a lubricant and as an addition agent in an amount to improve the characteristics of lubricating oils and greases, comprising the reaction product of phosphorus pentasulfide and degras reacted at a temperature to replace a major portion of the oxygen in the wax with sulfur, in admixture with a dual metal compound of said reaction product.

5. A composition of matter suitable for use as a lubricant and as an addition agent in an amount to improve the characteristics of lubricating oils and greases, comprising the reaction product of a phosphorus sulfide and an oxygen-containing wax, in admixture with a plural metal compound of said reaction product, at least one of the metals being selected from the alkali and alkaline earth metal groups.

6. A composition of matter suitable for use as a lubricant and as an addition agent in an amount to improve the characteristics of lubricating oils and greases, comprising the reaction product of a phosphorus sulfide and an oxygen-containing wax, in admixture with a plural metal compound of said reaction product, one of the metals being selected from the alkali and alkaline earth metal groups, the other metal being below magnesium in the electromotive series.

7. A composition of matter suitable for use as a lubricant and as an addition agent in an amount to improve the characteristics of lubricating oils and greases, comprising the reaction product of phosphorus pentasulfide and degras, in admixture with a dual metal compound of said reaction product, at least one of the metals being selected from the alkali and alkaline earth metal groups.

8. A composition of matter suitable for use as a lubricant and as an addition agent in an amount to improve the characteristics of lubricating oils and greases, comprising the reaction product of phosphorus pentasulfide and degras, in admixture with a dual metal compound of said reaction product, one of the metals being selected from the alkali and alkaline earth metal groups, the other metal being below magnesium in the electromotive series.

9. A composition of matter suitable for use as a lubricant and as an addition agent in an amount to improve the characteristics of lubricating oils and greases, comprising the reaction product of phosphorus pentasulfide and degras reacted at a temperature to replace a major portion of the oxygen in the wax with sulfur, in admixture with a calcium-arsenic compound of said reaction product.

10. A composition of matter suitable for use as a lubricant and as an addition agent in an amount to improve the characteristics of lubricating oils and greases, comprising the reaction product of phosphorus pentasulfide and an oxygen-containing wax reacted at a temperature to replace a major portion of the oxygen in the wax with sulfur, in admixture with a calcium-potassium compound of said reaction product.

11. A lubricant comprising a mineral lubricating oil and an addition agent in an amount to improve the characteristics of said oil comprising the reaction product of a phosphorus sulfide and an oxygen-containing wax, in admixture with a plural metal compound of said reaction product.

12. A lubricant comprising a mineral lubricating oil and an addition agent in an amount to improve the characteristics of said oil comprising the reaction product of phosphorus pentasulfide and degras, in admixture with a dual metal compound of said reaction product.

13. A lubricant comprising a mineral lubricating oil and an addition agent in an amount to improve the characteristics of said oil comprising the reaction product of phosphorus pentasulfide and degras, in admixture with a dual metal compound of said reaction product, at least one of the metals being selected from the alkali and alkaline earth metal groups.

14. A lubricant comprising a mineral lubricating oil and an addition agent in an amount to improve the characteristics of said oil comprising the reaction product of phosphorus pentasulfide and degras, in admixture with a dual metal compound of said reaction product, one of the metals being selected from the alkali and alkaline earth metal groups, the other metal being below magnesium in the electromotive series.

15. The process for making a composition suitable for use as a lubricant and as an addition agent to improve the characteristics of lubricating oils and greases, comprising reacting a phosphorus sulfide with an oxygen-containing wax at a temperature to prevent thiophosphate formation and to remove the major portion of the oxygen in the wax by reaction with the phosphorus in the sulfide, removing the phosphorus and oxygen-containing sludge from the reaction product, and reacting said product with compounds of a plurality of metals under conditions to partially saponify said product.

16. The process for making a composition suitable for use as a lubricant and as an addition agent to improve the characteristics of lubricating oils and greases, comprising reacting a phosphorus sulfide with an oxygen-containing wax at a temperature to prevent thiophosphate formation and to remove the major portion of the oxygen in the wax by reaction with the phosphorus in the sulfide, removing the phosphorus and oxygen-containing sludge from the reaction product, and reacting said product with compounds of a plurality of metals under conditions to partially saponify said product, at least one of the metals being selected from the alkali and alkaline earth metal groups.

17. The process for making a composition suitable for use as a lubricant and as an addition agent to improve the characteristics of lubricating oils and greases, comprising reacting a phosphorus sulfide with an oxygen-containing wax at a temperature to prevent thiophosphate formation and to remove the major portion of the oxygen in the wax by reaction with the phosphorus in the sulfide, removing the phosphorus and oxygen-containing sludge from the reaction product, and reacting said product with compounds of a plurality of metals under conditions to partially saponify said product, one of the metals being selected from the alkali and alkaline earth metal groups, the other metal being below magnesium in the electromotive series.

18. The process for making a composition suitable for use as a lubricant and as an addition agent to improve the characteristics of lubricating oils and greases, comprising reacting phosphorus pentasulfide with degras at a temperature to prevent thiophosphate formation and to remove the major portion of the oxygen in the degras by reaction with the phosphorus in the sulfide, removing the phosphorus and oxygen-containing sludge from the reaction product, and reacting said product with compounds of a plurality of metals under conditions to partially saponify said product.

19. The process for making a composition suitable for use as a lubricant and as an addition agent to improve the characteristics of lubricating oils and greases, comprising reacting phosphorus pentasulfide with degras at a temperature to prevent thiophosphate formation and to remove the major portion of the oxygen in the degras by reaction with the phosphorus in the sulfide, removing the phosphorus and oxygen-containing sludge from the reaction product, and reacting said product with compounds of a plurality of metals under conditions to partially saponify said product, at least one of the metals being selected from the alkali and alkaline earth metal groups.

20. The process for making a composition suitable for use as a lubricant and as an addition agent to improve the characteristics of lubricating oils and greases, comprising reacting phosphorus pentasulfide with degras at a temperature to prevent thiophosphate formation and to remove the major portion of the oxygen in the degras by reaction with the phosphorus in the sulfide, removing the phosphorus and oxygen-containing sludge from the reaction product, and reacting said product with compounds of a plurality of metals under conditions to partially saponify said product, one of the metals being selected from the alkali and alkaline earth metal groups, the other metal being below magnesium in the electromotive series.

21. The process for making a composition suitable for use as a lubricant and as an addition agent to improve the characteristics of lubricating oils and greases, comprising reacting phosphorus pentasulfide with degras at a temperature to prevent thiophosphate formation and to remove the major portion of the oxygen in the degras by reaction with the phosphorus in the sulfide, removing the phosphorus and oxygen-containing sludge from the reaction product, and reacting said product with compounds of calcium and arsenic under conditions to partially saponify said product.

JOHN M. MUSSELMAN.